United States Patent [19]

Burchell

[11] Patent Number: 5,615,490

[45] Date of Patent: Apr. 1, 1997

[54] RECEPTACLE LOCATOR

[76] Inventor: Richard A. Burchell, 13575 Rio Grande Rd., Brazil, Ind. 47834

[21] Appl. No.: 425,839

[22] Filed: Apr. 20, 1995

[51] Int. Cl.⁶ .................................................. G01B 1/00
[52] U.S. Cl. ........................ 33/528; 33/474; 33/DIG. 10
[58] Field of Search ........................... 33/474, 528, 562, 33/566, DIG. 10

[56] References Cited

U.S. PATENT DOCUMENTS

| | | | |
|---|---|---|---|
| 3,875,669 | 4/1975 | Hull | 33/DIG. 10 X |
| 3,954,717 | 5/1976 | Tarr | 33/DIG. 10 X |
| 4,126,941 | 11/1978 | Clarke | 33/DIG. 10 X |
| 4,787,432 | 11/1988 | Williams | 33/562 X |
| 4,793,069 | 12/1988 | McDowell | 33/528 |
| 4,890,391 | 1/1990 | Warren | 33/DIG. 10 X |
| 4,984,613 | 1/1991 | Szeto et al. | 33/562 X |
| 5,111,593 | 5/1992 | Gehen, Sr. | 33/DIG. 10 X |
| 5,172,483 | 12/1992 | Yocono, Sr. et al. | 33/DIG. 10 X |
| 5,222,303 | 6/1993 | Jardine | 33/528 |
| 5,348,274 | 9/1994 | Breen | 33/DIG. 10 X |

Primary Examiner—Carl D. Friedman
Assistant Examiner—Aimee E. McTigue
Attorney, Agent, or Firm—Baker & Daniels

[57] ABSTRACT

A device for locating the position of a receptacle in a wall which is covered during the construction process. The receptacle locating device includes a guide module, such as a plate-shaped body with an interior opening conforming to the configuration of a receptacle, for indicating the receptacle. The receptacle locating device also includes an attachment module for connecting the guide module to a portion of a mounting apparatus, such as a leg of a squaring tool. When another portion of the mounting apparatus, such as the other leg of the squaring tool, is held against a second wall, such as the floor, that intersects the first wall, the receptacle locating device attached to the mounting apparatus can be aligned with the receptacle and later used to pinpoint the location of the receptacle after the receptacle is subsequently covered. The present invention also provides a method for locating an opening through a sheet material for a receptacle installed to a framework of a wall and coverable with the sheet material.

14 Claims, 2 Drawing Sheets

RECEPTACLE LOCATOR

BACKGROUND OF THE INVENTION

The present invention pertains to an apparatus employed to facilitate building construction, and, in particular, to an apparatus for locating the installed position of a receptacle such as an electrical outlet box.

During the constructing or remodeling of a room within a business or residential dwelling, walls are typically formed by initially erecting a framework including wood or metal studs. Electrical wiring is then routed through the framework and terminated at electrical receptacles for light switches, outlets and junction boxes separately mounted to the framework studs. Phone lines, speaker wire and coaxial cable for cable television wired through the framework may also terminate at receptacles to facilitate installation. Eventually, the wired framework is normally covered by sheet materials such as drywall sheets, paneling, or laths that serve as a plaster base.

One difficulty with using sheet materials, for example drywall, to cover the framework is that openings need to be provided within the drywall to allow access to the already installed receptacles. To provide these openings, frequently a drywall installer will meticulously measure the precise location of the installed receptacle prior to drywall mounting, cut a hole in the yet to be hung drywall, and then fasten the sheet material to the framework while being careful to align the cut hole and the receptacle. In addition to being time consuming, this method provides ample opportunity for errors to be made in the measuring and drywall mounting which could cause the opening in the drywall to not properly line up with the receptacle.

Other methods of providing properly placed openings in the drywall for the receptacles suffer from other shortcomings. In one method, after the drywall is hung, the installer uses a cutting tool to first penetrate the drywall in the believed location of the receptacle. The cutting tool is then maneuvered along the face of the drywall by the installer until the tool hits the receptacle. Problems with this method include that the cutting tool may damage receptacles which are made from plastic as well as the wiring at the receptacle. Another method uses a device, attachable to the receptacle prior to drywall hanging, that provides indentations into the drywall when the drywall is held against the framework at the location where it is to be installed. The drywall is then lowered and an awl is used to pierce the drywall at the indentations. A provided template is used with the holes pierced in the drywall to mark the area to be cut for receptacle access. After cutting of the marked hole, the drywall can be hung. This method is inconvenient and time consuming as the drywall must be moved into an installed position on multiple occasions.

Thus, it would be desireable to provide an apparatus which may be used to locate the installed position of receptacles covered during the construction process.

SUMMARY OF THE INVENTION

The present invention provides a device that facilitates the task of installing sheet material such as drywall on a wall by simplifying the process by which an opening in the drywall for access to a receptacle may be provided.

In one form thereof, the present invention provides a receptacle locating device for use with a mounting apparatus to locate a receptacle in a first wall, wherein a plane of the first wall is intersected by a plane of a second wall, and wherein a first portion of the mounting apparatus extends over a part of the first wall when a second portion of the mounting apparatus operatively engages the second wall. The receptacle locating device includes a guide module for indicating a receptacle, and an attachment module for connecting the guide module to the mounting apparatus first portion.

In another form thereof, the present invention provides a method for locating an opening through a sheet material for a receptacle installed to a framework of a first wall and coverable with the sheet material. The method comprises the steps of providing a mounting apparatus having a first portion and a second portion, wherein the first and second portions are arranged such that the first portion is disposed forward of the first wall when the second portion is positioned in abutting relationship with a second wall; providing a receptacle locator used to indicate the location of the receptacle; positioning the receptacle locator in alignment with the receptacle; attaching the receptacle locator to the apparatus first portion at a location whereat the receptacle locator may be arranged in alignment with the receptacle while the apparatus second portion is in abutting relationship with the second wall; providing a mark on the second wall in a predetermined relationship to a position occupied by the apparatus second portion when the apparatus second portion is in abutting relationship with the second wall and the attached receptacle locator is in alignment with the receptacle; mounting the sheet material to cover the receptacle while the receptacle locator attached to the mounting apparatus is removed from alignment with the receptacle; and returning the apparatus second portion to the position in predetermined relationship with the mark on the second wall, whereby the receptacle locator attached to the mounting apparatus will overlay the sheet material covering the receptacle and indicate the location at which the opening through the sheet material for the receptacle may be provided.

One advantage of the receptacle locator of the present invention is that receptacles can be conveniently pinpointed behind hung drywall with little chance for error.

Another advantage of the present invention is that it does not interfere with the mounting of sheet materials on the wall framework.

BRIEF DESCRIPTION OF THE DRAWINGS

The above mentioned and other advantages and objects of this invention, and the manner of attaining them, will become more apparent and the invention itself will be better understood by reference to the following description of an embodiment of the invention taken in conjunction with the accompanying drawings, wherein.

Figure 1:
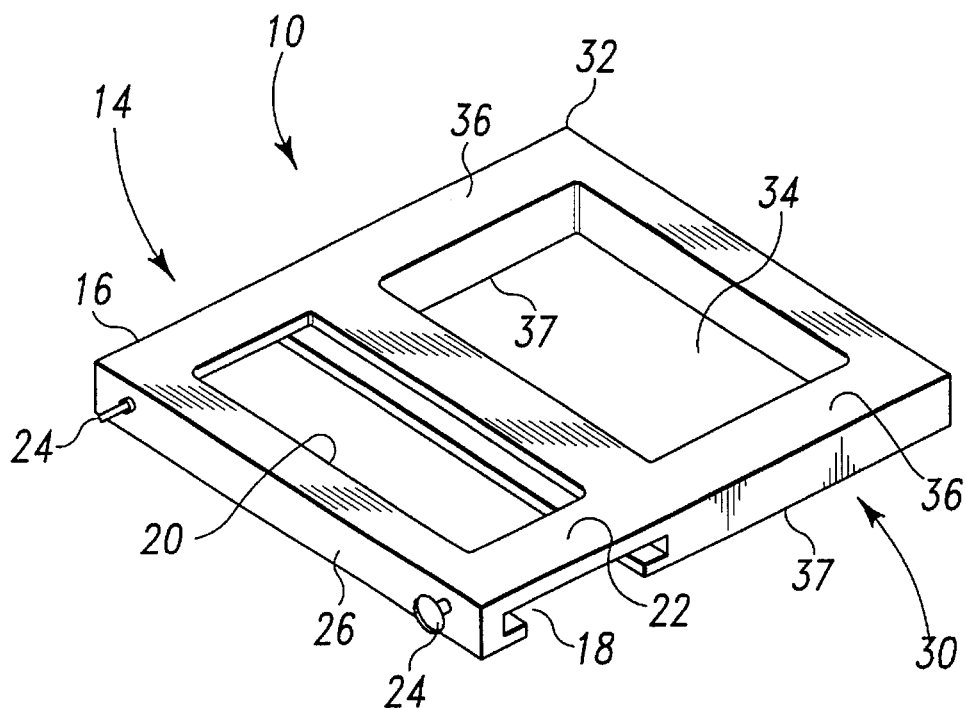
FIG. 1 is a perspective view of one embodiment of a receptacle locator according to the principles of the present invention.

Corresponding reference characters indicate corresponding parts throughout the several views. Although the drawings represent an embodiment of the invention, the drawings are not necessarily to scale and certain features may be exaggerated or omitted in order to better illustrate and explain the present invention.

DESCRIPTION OF THE PREFERRED EMBODIMENT

Referring now to FIG. 1, there is illustrated in perspective view one embodiment of a receptacle locator, generally designated 10, configured according to the principles of the present invention. Receptacle locator 10 is shown having a unitary construction formed from machined barstock or by a metal casting process. While other rigid materials of construction including plastics may be used, metal is preferred to allow locator 10 to better function as a cutting template without incurring damage from a sheet material cutting tool.

Locator 10 requires two elements for effective operation, namely an attachment module, generally designated 14, and a guide module, generally designated 30. In order for receptacle locator 10 to be advantageously utilized with existing squaring tools that are standard equipment of or readily available to, for example, drywall installers, attachment module 14 is shown designed to attach to such squaring tools. Attachment module 14 includes a rectangular, plate-shaped body 16 through which a longitudinally arranged slot 18 completely extends. Slot 18 is generally rectangular in transverse cross-section and sized and shaped to slidably receive therein a slat-shaped upper leg 44 of framing square 42 (See FIG. 2) or of a drywall square. Aperture 20 in the front face 22 of body 16 opens into slot 18. When framing square leg 44 is received within slot 18, aperture 20 serves as a viewing window through which graduations provided on square leg 44 are visible. A pair of thumb screws 24 provided in tapped holes through body side surface 26 extend into slot 18. Turning of screws 24 allows a user to adjust the effective slot size and to positively secure attachment module 14 at a selected location along the height of square leg 44.

Alternate attachment module constructions are within the scope of the invention. For example, the slotted body could be replaced with one or more clamping elements of a more conventional shape extending from guide module 30 to attach to square leg 44. While attachment module 14 could also be configured to freely slide along square leg 44, such that a user would depend on the markings on leg 44 to position locator 10, or could be configured or provided with biasing members to achieve a tight frictional fit with square leg 44, the tightenable securement provided, for example by screws 24, is preferred to reduce the possibility of error or slippage along leg 44 in the use of locator 10.

Guide module 30 is used to represent the location of a receptacle which has either previously been installed or is being installed as described further below. Guide module 30 is shown integrally formed with attachment module 14, but could be separately formed and attached thereto, and includes a plateshaped, rectangular body 32 through which a centrally located interior opening 34 extends. Opening 34 is rectangularly shaped corresponding to the outline of standard electrical receptacle boxes and is sized slightly larger than such boxes. From front surface 36 to back surface 37 of body 32, the walls defining the sides of opening 34 slant outwardly such that the area of opening 34 at back surface 37 is greater than the area of opening 34 at front surface 36. When used as a cutting template for cutting sheet material over a covered receptacle, the slanting sides of opening 34 better prevents damage to the template which could be caused by contact with a drywall router bit or saw.

It will be appreciated by those of skill in the art that alternative guide module configurations may be employed within the scope of the invention. For example, differently shaped openings may be suitable for other applications, such as an octagonal or round opening for indicating receptacles often provided in ceilings for electrical fixtures. In addition, guide module 30 could be structured such that its outer periphery generally corresponds to a receptacle size and shape, and therefore cutting around the exterior of the guide module would achieve the receptacle access hole.

Figure 2:
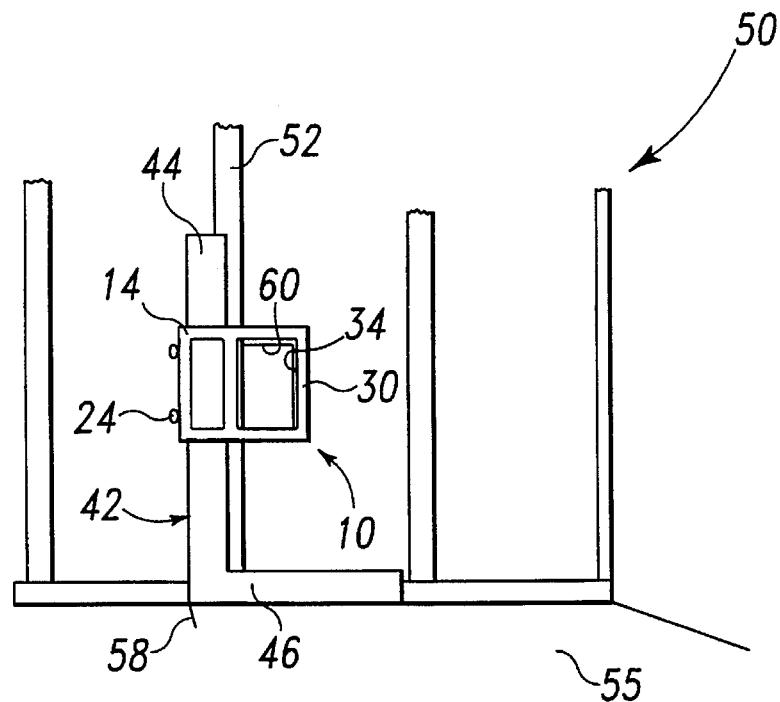
FIG. 2 is a front view of the receptacle locator of FIG. 1 mounted on a framing square and shown juxtaposed with a receptacle box previously installed to a framing stud.
Figure 3:
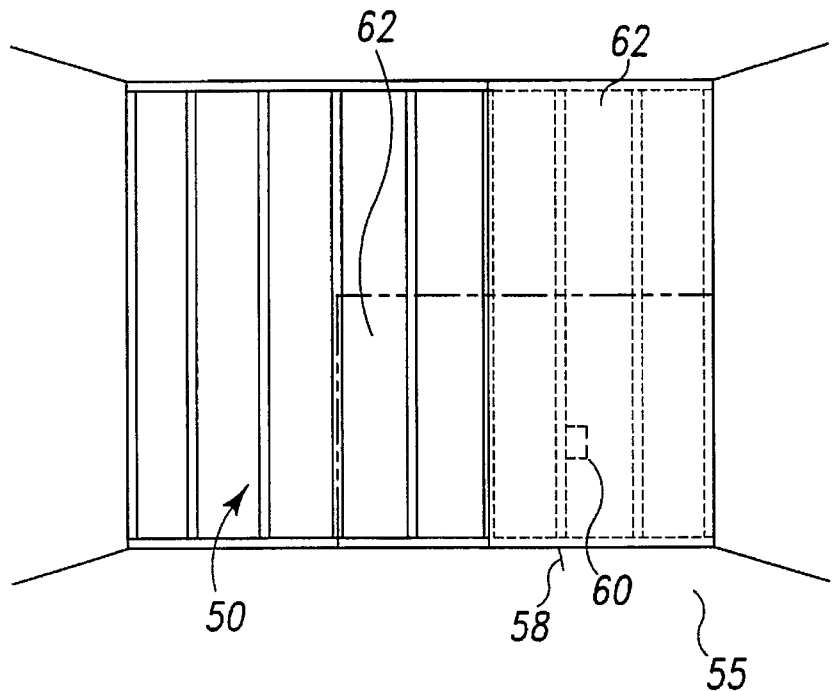
FIG. 3 is a front view of a room being constructed with the framing stud and receptacle box of FIG. 2 being covered by a sheet material such as drywall.
Figure 4:
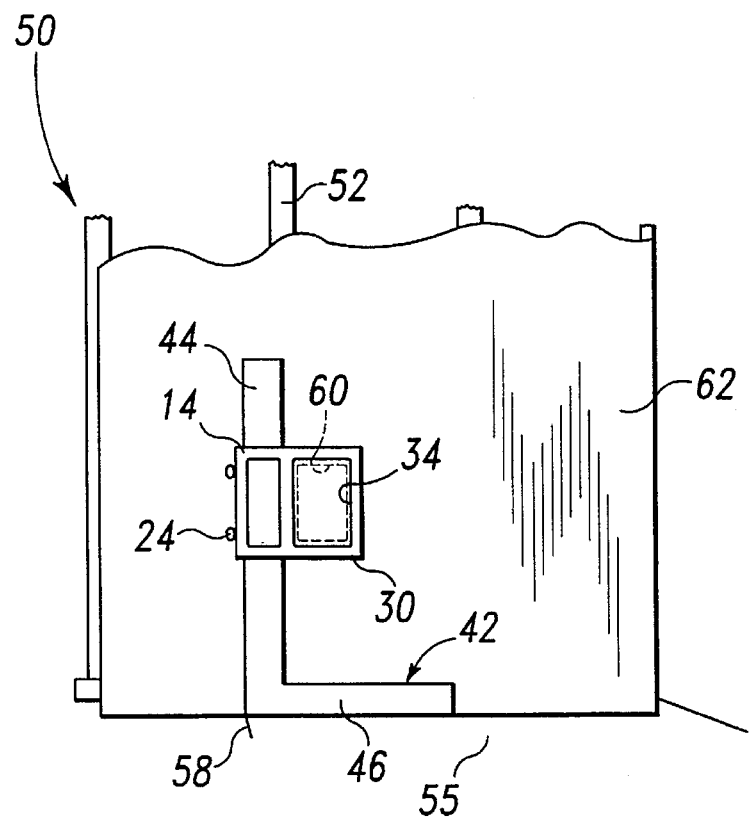
FIG. 4 is a front view of the receptacle locator and framing square of FIG. 2 being employed to pinpoint the covered receptacle box of FIG. 3.

With further reference to FIGS. 2–4, the structure of receptacle locator 10 will be further understood in view of the following description of its operation. As shown in FIG. 2, a vertical or side wall of a room is being formed. The partially shown wall framework 50 includes spaced studs 52 and is vertically disposed relative to the floor or bottom wall 55. Mounted to the side of one stud 52 is an abstractly shown receptacle 60, which in this case is an electrical outlet box.

Before sheet material such as drywall is fastened to framework 50, attachment module 14 of receptacle locator 10 is connected to framing square 42 by inserting leg 44 into slot 18. As long as thumb screws 24 are sufficiently loosened, receptacle locator 10 may slide up and down along the length of upper leg 44 for adjustment purposes. Locator 10 is then maneuvered into a stacked juxtaposition with receptacle 60.

In particular, while keeping its lower leg 46 flush with floor 55, framing square 42 is horizontally moved along the face of framework 50 until guide module 30 is horizontally aligned with receptacle 60. By its sliding up or down along square upper leg 44, receptacle locator 10 can be positioned such that receptacle 60 is visible within guide module opening 34 as shown in FIG. 2. Slightly more spacing between the top of receptacle 60 and the top edge of opening 34 than between the bottom of receptacle 60 and the bottom edge of opening 34 are preferably provided as shown to account for the slanting of the sheet material during the cutting process described below. At this point, thumb screws 24 are tightened to fix or secure guide module 30 to upper leg 44, and a visible mark 58 is provided on the floor in a predetermined relationship with square 42, such as at an end of framing square 42, for later use.

With reference now to FIG. 3, after the secured together receptacle locator 10 and framing square 42 are moved away, sheet material such as drywall panels may be hanged to cover the framework 50 and installed receptacle 60. Two ways of hanging a drywall panel 62 to cover a shadowed receptacle 60 are shown in dashed lines. Only the top edge of the panel is tacked or attached at this point.

With reference now to FIG. 4, after drywall hanging the already secured together receptacle locator 10 and framing square 42 are retrieved. After the bottom of drywall panel 62 is pulled away from framework 50 a small amount, for example about two inches, such that the receptacle box 60 and stud 52 do not interfere with the drywall cutting process, mark 58 is used to return framing square 42 as shown in FIG. 4 to its previous floor alignment. It will be appreciated that the portion of drywall panel 62 requiring removal to access covered receptacle 60 shown in shadow is exposed within guide module opening 34. Guide module 30 serves as a cutting template as the internal periphery of opening 34 can be followed with a hand-held drywall router or a drywall saw. After cutting of the opening in this manner, the receptacle locator 10 may be removed and the drywall finished by the installer. Or, if so desired, guide module 30 may be used to mark the location of the receptacle behind the sheet material and then removed prior to the cutting of the sheet material.

While described with reference to locating a receptacle in a vertical side wall, the instant invention may be used to locate a receptacle in the floor or ceiling, i.e. the bottom or top wall of a room, by providing mark 58 on a side wall. In addition, when multiple receptacles such as for light switches are positioned in adjacent relationship, multiple horizontally spaced marks can be positioned on floor 55 for use with the secured together receptacle locator 10 and framing square 42.

In addition to being used to pinpoint the location of covered receptacles during wall construction, receptacle locator 10 may also be used to install new receptacles in existing walls. For example, functioning in a similar fashion as described above but without floor marking requirements, the receptacle locator 10 mounted to the framing square 42 may be used as a stable template to aid in cutting a hole into a wall in which a receptacle box is inserted.

While receptacle locator 10 is described above in use with squaring tools such as framing or drywall squares, the concept of the present invention may be employed with alternate tools, although modification of shown attachment module 14 might be required to effect connection with these alternate tools. An assortment of tools which can suspend or support receptacle locator 10 in front of a wall mounted receptacle while simultaneously engaging a marked, intersecting wall or floor in a fashion capable of duplication may be employed within the scope of the invention. For example, a receptacle locator 10 may possibly be made connectable to a level. However, the ready availability of framing squares 42 and the simplicity and accuracy of their use makes them the preferred tool for use with receptacle locator 10.

While this invention has been described as having a preferred design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A receptacle locating device for use with a squaring tool to locate a receptacle in a first wall, wherein a plane of the first wall is intersected by a plane of a second wall, and wherein a first leg of the squaring tool extends over a part of the first wall when a second leg of the squaring tool engages the second wall, the receptacle locating device comprising:
    a guide module for indicating a receptacle, wherein said guide module comprises a body with an opening therethrough sized and configured to approximately correspond to the size and shape of a receptacle; and
    an attachment module for adjustably connecting said guide module to the squaring tool first leg, wherein said attachment module comprises a body with a slot generally having a rectangularly shaped transverse cross-section configured to receive a slat-shaped squaring tool leg, and at least one screw adjustably extending into said slot to secure said attachment module to the slat-shaped squaring tool leg.

2. The receptacle locating device of claim 1 wherein said attachment module further comprises a first portion viewing window opening into said slot.

3. The receptacle locating device of claim 1 wherein said guide module body comprises a front surface and a rear surface, and wherein said opening tapers in size from said rear surface to said front surface.

4. A receptacle locating assembly for locating a receptacle in a first wall, wherein a plane of the first wall is intersected by a plane of a second wall, the assembly comprising:
    a mounting apparatus comprising first and second legs, said first leg oriented in a first angular relationship with respect to said second leg, wherein said second leg comprises a straight edge, wherein said second leg straight edge is positionable in abutting relationship with the second wall, and wherein said first and second legs are structured such that said first leg is disposed forward of the first wall when said second leg is positioned in said abutting relationship with the second wall;
    a receptacle locator comprising guide means for visually representing a location of the receptacle, said guide means comprising a body with a receptacle sized opening providing a cutting template, said receptacle locator further comprising means for adjustably connecting said guide means to said first leg at one of a plurality of positions along a length of said first leg, wherein said guide means is one of positionable in juxtaposition with a receptacle installed in the first wall and positionable in juxtaposition with a location wherein a receptacle is to be installed in the first wall when said guide means is connected to said first leg and when said second leg is positioned in said abutting relationship with the second wall.

5. The receptacle locating assembly of claim 4 wherein said mounting apparatus comprises a squaring tool, and wherein said first and second legs comprise first and second orthogonally configured legs of said squaring tool.

6. The receptacle locating assembly of claim 5 wherein said connecting means comprises a body with a slot, said slot adapted to slidably receive said squaring tool first leg.

7. The receptacle locating assembly of claim 6 further comprising means for securing said connecting means to said squaring tool first leg to prevent relative motion therebetween.

8. The receptacle locating assembly of claim 4 wherein said opening tapers in size from a rear surface of said body to a front surface of said body.

9. A method for locating an opening through a sheet material for a receptacle installed to a framework of a first wall and coverable with the sheet material, wherein a plane of the first wall is intersected by a plane of a second wall, the method comprising the steps of:
    providing a mounting apparatus having a first portion and a second portion, wherein said first and second portions are arranged such that said first portion is disposed forward of the first wall when said second portion is positioned in abutting relationship with the second wall, said second portion extending from said first portion in a fixed angular relationship therewith, said second portion comprising a straight edge for abutting said second wall;
    providing a receptacle locator used to indicate the location of the receptacle;
    positioning said receptacle locator in alignment with the receptacle;

attaching said receptacle locator to said apparatus first portion at a location whereat said receptacle locator may be arranged in alignment with the receptacle while said apparatus second portion is in abutting relationship with the second wall;

providing a mark on the second wall in a predetermined relationship to a position occupied by said apparatus second portion when said apparatus second portion is in abutting relationship with the second wall and said attached receptacle locator is in alignment with the receptacle;

mounting the sheet material to cover the receptacle while the receptacle locator attached to the mounting apparatus is removed from alignment with the receptacle; and returning said apparatus second portion to said position in predetermined relationship with said mark on the second wall, whereby said receptacle locator attached to the mounting apparatus will overlay the sheet material covering the receptacle and indicate the location at which the opening through the sheet material for the receptacle may be provided.

10. The method of claim 9 wherein said mounting apparatus comprises a squaring tool, and wherein said first portion and said second portion respectively comprise orthogonally arranged first and second slat-shaped legs.

11. The method of claim 10 wherein said receptacle locator comprises an attachment module comprising a slot adapted to accommodate said first slat-shaped leg.

12. The method of claim 11 wherein said receptacle locator further comprises means for securing said attachment module at a selected location along the length of said first slat-shaped leg.

13. The method of claim 9 wherein said receptacle locator comprises a guide module including a opening therethrough.

14. The method of claim 13 further comprising the step of cutting the sheet material to provide the opening for the receptacle by using said guide module opening as a cutting template.

\* \* \* \* \*